(12) United States Patent
Oh et al.

(10) Patent No.: US 11,235,770 B2
(45) Date of Patent: Feb. 1, 2022

(54) REGENERATIVE BRAKE METHOD OF VEHICLE

(71) Applicants: Hyundai Motor Company, Seoul (KR); KIA Motors Corporation, Seoul (KR)

(72) Inventors: Ji Won Oh, Hwaseong-si (KR); Jeong Soo Eo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/897,458

(22) Filed: Jun. 10, 2020

(65) Prior Publication Data

US 2021/0163007 A1    Jun. 3, 2021

(30) Foreign Application Priority Data

Dec. 2, 2019 (KR) .................. 10-2019-0158425

(51) Int. Cl.
*B60W 30/18* (2012.01)
*B60W 10/08* (2006.01)
*B60W 10/11* (2012.01)
*B60W 10/196* (2012.01)

(52) U.S. Cl.
CPC ...... *B60W 30/18127* (2013.01); *B60W 10/08* (2013.01); *B60W 10/11* (2013.01); *B60W 10/196* (2013.01); *B60W 2510/081* (2013.01); *B60W 2510/083* (2013.01); *B60W 2510/10* (2013.01); *B60W 2510/1005* (2013.01); *B60W 2510/18* (2013.01); *B60W 2510/244* (2013.01); *B60W 2540/00* (2013.01); *B60W 2710/081* (2013.01); *B60W 2710/1005* (2013.01); *B60W 2710/18* (2013.01)

(58) Field of Classification Search
CPC .......... B60W 30/18127; B60W 10/08; B60W 2510/244
See application file for complete search history.

(56) References Cited

U.S. PATENT DOCUMENTS

| 10,150,462 | B2 | 12/2018 | Bang | |
| 10,315,645 | B2 | 6/2019 | Lee | |
| 2018/0099580 | A1* | 4/2018 | Kumazaki | ............. B60W 20/15 |
| 2018/0354495 | A1* | 12/2018 | Kumazaki | ............. B60K 6/365 |

* cited by examiner

*Primary Examiner* — Derek D Knight
(74) *Attorney, Agent, or Firm* — McDonnell Boehnen Hulbert & Berghoff LLP

(57) ABSTRACT

The present disclosure provides a regenerative brake method of a vehicle, including selecting and inputting one of a plurality of regenerative brake modes by a driver and recognizing the regenerative brake mode selected by the driver, by a controller, determining on/off-state of an active shift control (ASC) function by the controller when the regenerative brake mode selected by the driver is an efficiency-preferred mode or an intermediate mode, controlling a motor speed during regenerative brake and simultaneously performing ASC control for changing a gear stage, by the controller when the ASC function is in the on-state, and controlling gear shift for changing a gear stage without control of a motor speed during regenerative brake, by the controller when the ASC function is in the off-state.

14 Claims, 6 Drawing Sheets

◄─── DRIVABILITY-PREFERRED MODE
◄─── EFFICIENCY-PREFERRED MODE
◄─── INTERMEDIATE MODE

| | | \multicolumn{8}{c}{RPM} | | | | | | | |
|---|---|---|---|---|---|---|---|---|---|
| | Chg | 500 | 1000 | 1400 | 2000 | 3000 | 4000 | 4950 | 5500 |
| | -205 | 55 | 76 | 82 | | | | | |
| | -200 | 57 | 77 | 82 | | | | | |
| | -190 | 59 | 78 | 83 | | | | | |
| | -180 | 62 | 79 | 84 | | | | | |
| | -170 | 64 | 80 | 85 | 89 | | | | |
| | -160 | 66 | 82 | 86 | 89 | | | | |
| | -150 | 68 | 83 | 86 | 90 | | | | |
| | -140 | 70 | 83 | 87 | 90 | | | | |
| | -130 | 71 | 84 | 88 | 90 | | | | |
| | -120 | 73 | 85 | 88 | 91 | 92 | | | |
| Tq | -110 | 74 | 86 | 89 | 91 | 92 | | | |
| | -100 | 76 | 86 | 89 | 91 | 93 | | | |
| | -90 | 77 | 87 | 90 | 92 | 93 | | | |
| | -80 | 78 | 88 | 90 | 92 | 93 | 92 | | |
| | -70 | 80 | 88 | 91 | 92 | 93 | 93 | | |
| | -60 | 81 | 89 | 91 | 92 | 94 | 93 | 92 | 91 |
| | -50 | 82 | 89 | 91 | 92 | 93 | 93 | 92 | 91 |
| | -40 | 83 | 89 | 91 | 92 | 93 | 93 | 92 | 91 |
| | -30 | 84 | 90 | 91 | 92 | 92 | 92 | 90 | 90 |
| | -20 | 83 | 89 | 90 | 90 | 91 | 90 | 89 | 87 |
| | -10 | 78 | 84 | 85 | 85 | 85 | 84 | 83 | 79 |

FIG. 3

REGENERATIVE BRAKE METHOD OF VEHICLE

CROSS-REFERENCE TO RELATED APPLICATIONS

This application claims under 35 U.S.C. § 119(a) the benefit of priority to Korean Patent Application No. 10-2019-0158425 filed on Dec. 2, 2019, the entire contents of which are incorporated herein by reference.

FIELD

The present disclosure relates to a regenerative brake method of a vehicle, and more particularly, a regenerative brake method of a vehicle for increasing regenerative efficiency while overcoming a conventional problem related to a sense of driving unfamiliarity due to adjustment of a driving point during regeneration of an electric motored vehicle driven by a motor.

BACKGROUND

An eco-friendly vehicle such as a hybrid electric vehicle (HEV) driven using an electric motor as a driving source, a pure electric vehicle (EV), or a fuel cell electric vehicle (FCEV) performs regenerative brake of charging a battery by recovering kinetic energy of a vehicle as electric energy through power generation of an electric motor during brake.

In addition to such regenerative brake, the eco-friendly vehicle may also perform hydraulic brake as a driver manipulates a brake pedal, and regenerative brake based on coast regenerative torque that is generated during coasting.

When target braking force as braking force requested by a driver is calculated based on a brake signal corresponding to driver's brake manipulation (driver's brake input), for example, a signal of a brake pedal sensor (BPS) based on brake pedal manipulation, regenerative braking force and hydraulic braking force (frictional braking force), which satisfy the target braking force, may be distributed.

When the regenerative braking force and the hydraulic braking force are determined by distributing the braking forces, motor regenerative brake control and hydraulic brake control for exerting each of the distributed braking forces may be performed.

As such, an electric motored vehicle driven by an electric motor, such as a hybrid electric vehicle or an electric vehicle, requires a regenerative brake function in order to increase vehicle efficiency and fuel efficiency.

The electric motored vehicle may recover a larger amount of energy as regenerative efficiency is increased during regenerative brake, in which case a driving point of a motor needs to be frequently adjusted during regeneration.

Adjustment and control of a driving point of a motor during regeneration may be performed through gear shift, and for example, an electric motored vehicle including a multi-stage transmission installed therein requires a discontinuous change in gear ratio of the transmission, and thus a sense of driving unfamiliarity may be generated when a motor driving point is adjusted in consideration of regenerative efficiency.

Accordingly, there is a problem in that regenerative brake needs to be always performed in a region with lower regenerative efficiency than an optimum regenerative driving point in order to prevent a sense of driving unfamiliarity from being generated.

SUMMARY

The present disclosure has been made in an effort to solve the above-described problems associated with prior art.

In one aspect, the present disclosure provides a regenerative brake method of a vehicle for increasing regenerative efficiency while overcoming a conventional problem related to a sense of driving unfamiliarity due to adjustment of a driving point during regeneration of an electric motored vehicle driven by a motor.

According to the present disclosure, diversified regenerative brake methods may be provided to allow the driver to select a desired regenerative brake method, and a driving point selection strategy may be performed during regeneration.

In a preferred embodiment, a regenerative brake method of a vehicle includes selecting and inputting one of a plurality of regenerative brake modes by a driver and recognizing the regenerative brake mode selected by the driver, by a controller, determining an on/off-state of an active shift control (ASC) function by the controller when the regenerative brake mode selected by the driver is an efficiency-preferred mode or an intermediate mode, controlling a motor speed during regenerative brake and simultaneously performing ASC control for changing a gear stage, by the controller when the ASC function is in the on-state, and controlling gear shift for changing a gear stage without control of the motor speed during regenerative brake, by the controller when the ASC function is in the off-state.

When a battery state of charge (SOC) state is a high SOC state with a predetermined setting level or greater, the controller may control regenerative brake of a drivability-preferred mode for gear shift using a drivability-preferred gear shift map during regenerative brake.

When a battery state of charge (SOC) state is not a high SOC state with a predetermined setting level or greater, the selecting and inputting, the determining, the controlling the motor speed, and the controlling the gear shift may be performed.

When the regenerative brake mode selected by the driver is not an efficiency-preferred mode and an intermediate mode, if a battery state of charge (SOC) state is a low SOC state with a predetermined setting level or less, the controller may determine the on/off-state of the ASC function and then performs the controlling the motor or the controlling the gear shift.

The determining the on/off-state may include, when the regenerative brake mode selected by the user is the efficiency-preferred mode or the intermediate mode, if a current state is a regenerative brake on-state satisfying a regenerative brake condition, calculating each of regenerative power when a gear stage is changed and regenerative power when a current gear stage is maintained, by the controller, and when the regenerative power when the gear stage is changed is larger than the regenerative power when the current gear stage is maintained, determining the on/off-state of the ASC function, by the controller.

The determining may include, when the regenerative power when the gear stage is changed is larger than the regenerative power when the current gear stage is maintained, determining whether a constraint condition determined when the gear stage is changed is satisfied, by the controller, and when the predetermined constraint condition is satisfied, determining the on/off-state of the ASC function, by the controller.

When the regenerative power when the gear stage is changed is equal to or less than the regenerative power when the current gear stage is maintained, or the constraint condition determined when the gear stage is changed not satisfied, the controller may control regenerative brake of a drivability-preferred mode in which gear shift is performed using a drivability-preferred gear shift map during regenerative brake.

The constraint condition may include a condition in which a motor speed and motor torque are present in an allowable range after gear shift.

The constraint condition may include a condition in which an elapsed time after immediately previous gear shift is within a setting time when the same gear stage number as the immediately previous gear shift is returned.

The controlling the motor speed may include, when the ASC function is in the on-state, predicting a regenerative energy amount in the case of ASC and a regenerative energy amount when a current gear stage is maintained, by the controller, and comparing the regenerative energy amount in the case of ASC with the regenerative energy amount when the current gear stage is maintained, and when the regenerative energy amount in the case of ASC is larger than the regenerative energy amount when the current gear stage is maintained, controlling the motor speed during regenerative brake and simultaneously performing ASC control for changing a gear stage.

When the regenerative energy amount in the case of ASC is equal to or less than the regenerative energy amount when the current gear stage is maintained, the controller may control regenerative brake of a drivability-preferred mode for gear shift using a drivability-preferred gear shift map during regenerative brake.

The controlling the gear shift may include controlling regenerative brake of an efficiency-preferred mode or intermediate mode for gear shift using an efficiency-preferred gear shift map or an intermediate mode gear shift map during regenerative brake, by the controller when the ASC function is in the off-state.

The controlling the motor speed may include, when the ASC function is in the on-state, predicting a regenerative energy amount in the case of ASC and a regenerative energy amount when a current gear stage is maintained, by the controller, and comparing the regenerative energy amount in the case of ASC with the regenerative energy amount when the current gear stage is maintained, and when the regenerative energy amount in the case of ASC is larger than the regenerative energy amount when the current gear stage is maintained, performing ASC control using an efficiency-preferred gear shift map or an intermediate mode gear shift map during regenerative brake.

The controlling the motor speed may include, when the ASC function is in the on-state, performing ASC control using an efficiency-preferred gear shift map for ASC or an intermediate mode gear shift map for ASC during regenerative brake, by the controller.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 3 is a diagram illustrating an example in which a motor regenerative driving point for each mode is adjusted according to the present disclosure;

DETAILED DESCRIPTION

Exemplary embodiments of the present disclosure are described in detail so as for those of ordinary skill in the art to easily implement the present disclosure with reference to the accompanying drawings. However, the present disclosure may be implemented in various different forms and is not limited to these embodiments.

In the specification, when a certain part "includes" a certain component, this indicates that the part may further include another component instead of excluding another component unless there is no different disclosure.

In general, in an electric motored vehicle driven by a motor, a motor driving point with high regenerative efficiency needs to be selected in order to increase fuel efficiency during regeneration, and gear shift needs to be performed in order to select and adjust a desired motor driving point in consideration of regenerative efficiency, but when gear shift is performed in consideration of only a motor driving point with high regenerative efficiency, a sense of driving unfamiliarity may be generated to degrade a drivability of a vehicle.

As such, the drivability (a sense of driving) of the vehicle conflicts with regenerative efficiency and fuel efficiency.

Figure 1:
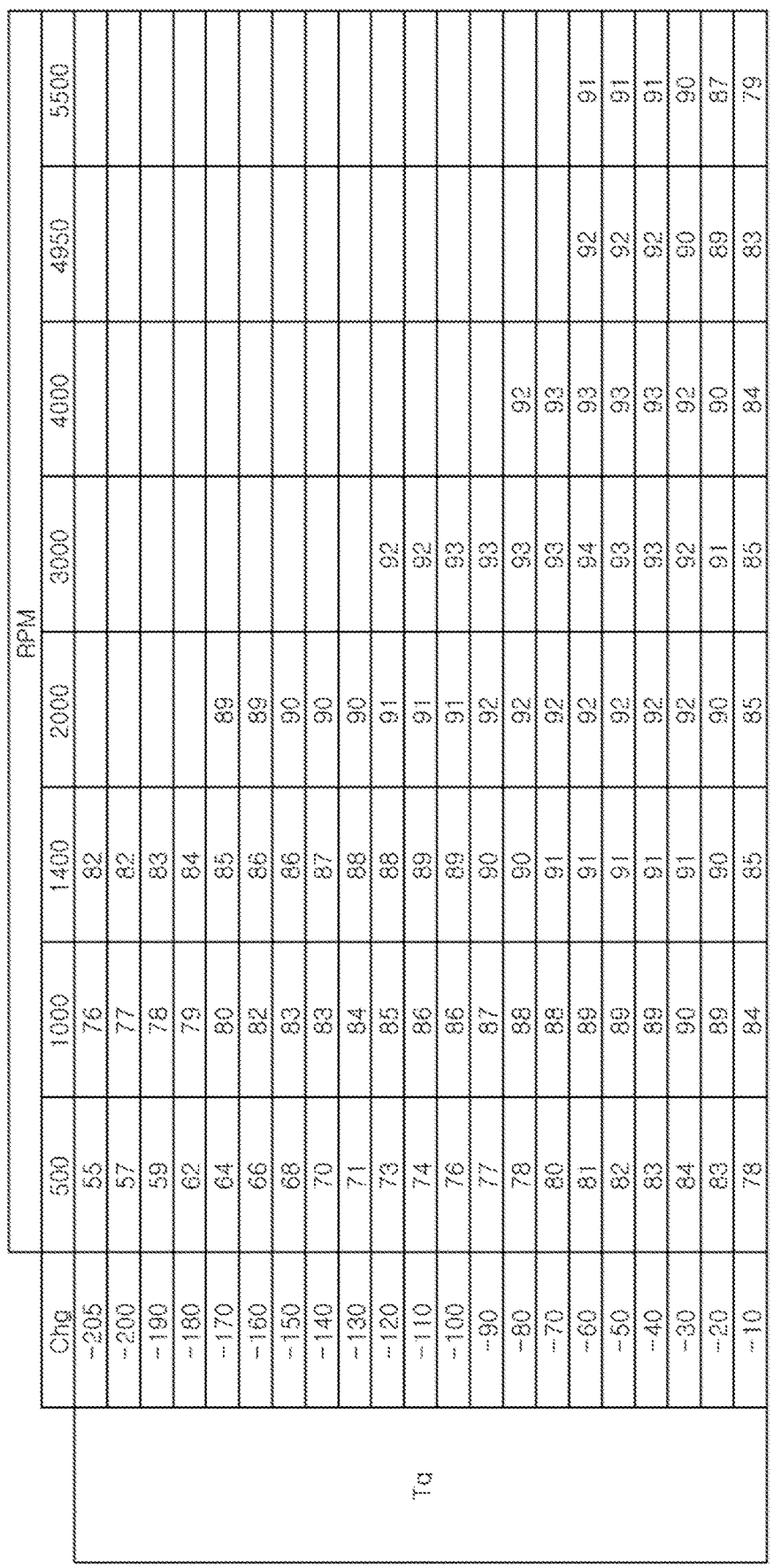
FIG. 1 illustrates an example of regenerative efficiency for each motor driving point during regeneration.

FIG. 1 illustrates an example of regenerative efficiency for each motor driving point during regeneration, and as seen from FIG. 1, efficiency is lowered in a region with low load and low speed due to the characteristics of a motor-inverter system.

In order to prevent a problem in terms of reduction in drivability such as noise, vibration, and harshness (NVH), a motor needs to be maintained at low speed while a vehicle decelerates, and thus, a motor regenerative driving point may be relatively inefficient.

Accordingly, a motor driving point needs to be adjusted during regeneration, and for example, when a 3-stage gear is used, if regeneration needs to be performed to 200 Nm at 1000 rpm (1000 rpm, −200 Nm), there may be considered an alternative of regeneration to 140 Nm at 1400 rpm (1400 rpm, −140 Nm) in the case of a 2-stage gear or regeneration to 100 Nm at 2000 rpm (2000 rpm, −100 Nm) in the case of a 1-stage gear under a condition in which the same sense of deceleration of the vehicle is maintained.

As seen from a table of FIG. 1, when regeneration is performed to 200 Nm at 1000 rpm, regenerative efficiency may be about 76%, but when regeneration is performed to 140 Nm at 1400 rpm, regenerative efficiency may be increased to about 87%, and when regeneration is performed to 100 Nm at 2000 rpm, regenerative efficiency may be increased to about 91%.

Based on this point, the present disclosure provides a regenerative brake method for increasing regenerative efficiency while overcoming a conventional problem related to a sense of driving unfamiliarity due to adjustment of a driving point during regeneration of an electric motored vehicle driven by a motor.

In particular, the present disclosure may have main technological features of providing diversified regenerative brake modes to allow a driver to select a regenerative brake mode.

That is, the drivability of the vehicle conflicts with regenerative efficiency and fuel efficiency, and thus, according to the present disclosure, even if the drivability (a sense of driving) of the vehicle is poor, the driver may be allowed to select a mode for increasing regenerative efficiency and vehicle fuel efficiency, and a mode for driving the vehicle with enhanced drivability despite lowered fuel efficiency.

As such, according to the present disclosure, diversified regenerative brake methods may be provided to allow the driver to select a desired regenerative brake method, and a driving point selection strategy based on the regenerative brake selected by the driver may be performed during regeneration.

The regenerative brake method according to the present disclosure may be useful in an electric motored vehicle driven by a motor, such as a hybrid electric vehicle, an electric vehicle, or a fuel cell vehicle, and may be applied to an electric motored vehicle including a multi-stage transmission installed therein, and in detail, the regenerative brake method may be usefully used in an electric motored vehicle with a double clutch transmission (DCT) installed therein.

Figure 2:
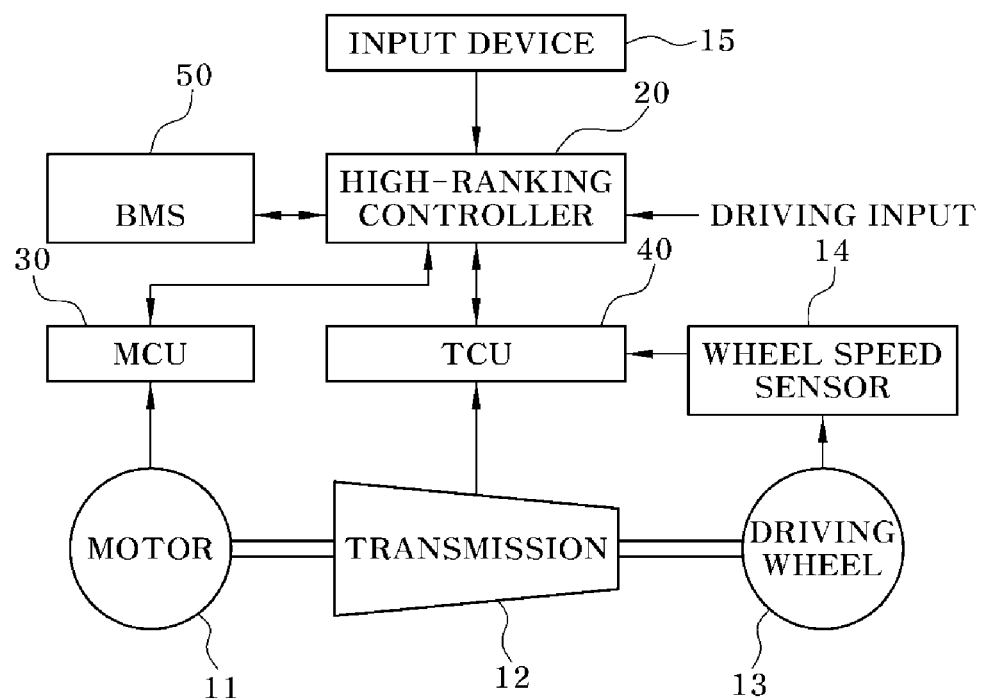
FIG. 2 is a diagram illustrating the configuration of a system for performing regenerative brake according to the present disclosure.

FIG. 2 is a diagram illustrating the configuration of a system for performing regenerative brake according to the present disclosure. The system for performing regenerative brake according to the present disclosure may include a motor 11 that is a driving device for driving a vehicle, a transmission 12 connected to an output side of the motor 11, a driving wheel 13 connected to an output side of the transmission 12 to transmit power thereto, and a wheel speed sensor 14 for detecting a rotation speed of the driving wheel 13.

The transmission 12 may be a multi-stage transmission, and in detail, may be a DCT, and the present disclosure may also be applied to a vehicle of a continuously variable transmission, but not a multi-stage transmission.

A driving wheel rotation speed detected by the wheel speed sensor 14 may be used to acquire current vehicle speed information.

Although not shown in FIG. 2, when the regenerative brake according to the present disclosure is a hybrid electric vehicle, the vehicle may include an engine connected to a motor to transmit power thereto, and an engine clutch for selectively switching power between the engine and the motor.

The system for performing regenerative brake according to the present disclosure may further include a high-ranking controller 20 (e.g., a hybrid control unit (HCU)/vehicle control unit (VCU)) for determining requested torque (driving torque and brake torque) based on driving information to generate and output a torque command, a motor control unit (MCU) 30 for controlling a driving and regenerative operation of the motor 11 according to the torque command of the high-ranking controller 20, and a transmission control unit (TCU) 40 for controlling an operation of the transmission 12.

The high-ranking controller 20 may determine a gear stage number which is targeted according to driving information, that is, a target stage number, may generate a transmission command according to the determined target stage number, and may transmit the transmission command to the TCU 40.

Thus, according to the transmission command of the high-ranking controller 20, the TCU 40 may control an operation of the transmission 12 to change a current gear stage number to the target stage number.

The high-ranking controller 20 may use a driver input and current vehicle speed information acquired through the wheel speed sensor 14 as driving information in order to determine the target stage number.

During regenerative brake, driver input of the driving information may be brake input, and in more detail, may be a brake pedal input detected by a brake pedal sensor (BPS).

The high-ranking controller 20 may receive current motor torque and motor speed information from the MCU 30 in order to determine a motor regenerative driving point during regenerative brake.

In addition, the system for performing regenerative brake according to the present disclosure may further include a battery management system (BMS) 50 for performing control for managing a battery state while collecting battery state information and managing battery charging and discharging control or the like.

Here, a battery may supply electric energy required to driving in a motor like in control of a motor speed of active shift control (ASC) to be described later while storing electric energy generated by regeneration of a motor.

The battery state information may include information on a state of charge (SOC) of a battery as well as voltage, current, temperature, or the like of the battery.

According to the present disclosure, a plurality of regenerative brake modes for changing a regenerative brake method may be provided, and when a driver selects one of the regenerative brake modes, regenerative brake may be performed in the selected mode.

In FIG. 2, an input device 15 may be included in a vehicle to be used to select a mode desired by a driver, and may be a known type of in-vehicle input device, such as a button, a switch, or knob.

When the driver selects and inputs one of a plurality of regenerative brake modes using the input device 15, the high-ranking controller 20 may receive a mode selection signal from the input device 15 to recognize a mode selected by the driver.

The high-ranking controller 20 may perform control in cooperation with other in-vehicle controllers such as the MCU 30, the TCU 40, and the BMS 50 in order to perform regenerative brake in a mode selected by the driver through the input device 15.

As such, the regenerative brake control according to the present disclosure may be performed by a plurality of controllers that perform cooperative control, such as the high-ranking controller 20, the MCU 30, the TCU 40, and the BMS 50, but may be performed by one integrated controller, and hereinafter, all of the plurality of controllers and one integrated controller will be referred to as a controller.

According to an embodiment of the present disclosure, a plurality of regenerative brake modes may include a drivability-preferred mode and an efficiency-preferred mode and may further include an intermediate mode.

Each of the modes is now described. The drivability-preferred mode may be a mode in which gear shift optimized for drivability (a sense of driving) is performed.

In the drivability-preferred mode, a vehicle may decelerate while maintaining the lowest motor speed (lowest rpm) as long as a problem does not occur in an engine stall, etc. using the highest gear stage within a range to be selected in order to reduce NVH in the vehicle, and a range of selecting the stage number may be considered in order to ensure reactivity when the vehicle re-decelerates.

The drivability-preferred mode may be a mode in which soft and comfortable drivability (a sense of driving) is preferred rather than regenerative efficiency and fuel efficiency, and when the driver selects the drivability-preferred mode, the highest gear stage may be selected among selectable gear stage numbers, and the highest gear stage may be maintained while selection of the drivability-preferred mode is maintained.

The efficiency-preferred mode may be defined as an eco-mode and may be a mode in which a gear stage having the highest regenerative efficiency is selected among selectable gear stages during regeneration and gear shift is performed, and in this case, the gear stage number is selected in consideration of regenerative efficiency, and thus skip shift, etc. may be performed, thereby causing a sense of driving unfamiliarity while the vehicle is driven.

However, the driver may select the above efficiency-preferred mode in consideration of only the lowest regenerative efficiency and fuel efficiency while disregarding a sense of driving unfamiliarity when the vehicle is driven.

The intermediate mode may be a mode having intermediate setting between the aforementioned drivability-preferred mode and efficiency-preferred mode and a mode of performing gear shift to avoid only a regenerative driving point with low efficiency, and in this case, the intermediate mode may also be defined as a regeneration increasing gear shift allowable mode like the efficiency-preferred mode.

Here, the regenerative driving point with low efficiency may be defined as a motor driving point having regenerative efficiency equal to or less than a predetermined efficiency reference value.

In this case, a plurality of more subdivided intermediate modes in which an efficiency reference value for defining the regenerative driving point with low efficiency is differently set may be provided to be selected by the driver.

As a method of embodying the efficiency-preferred mode within a range in which a motor speed (rmp) does not exceed a pre-set speed in order to overcome a problem in terms of NVH or drivability, an intermediate mode for selecting a driving point in a constraint condition in which an efficiency value is limited to the efficiency reference value may be performed.

According to the present disclosure, the driver may select desired one among the plurality of modes, i.e., a drivability-preferred mode, an efficiency-preferred mode, and an intermediate mode using the input device 15, and may further select whether active shift control (ASC) is performed during regenerative brake of each mode.

That is, the drier may select whether ASC is performed during regenerative brake using the input device 15, or alternatively, whether active shift control (ASC) is performed for each mode may be predetermined.

Here, the active shift control (ASC) refers gear shift for controlling motor torque in real time to minimize shifting shock during gear shift, and in this regard, low-gear shift may be performed when a vehicle decelerates, and thus a motor speed may be increased in an inertia phase of a gear shift procedure.

In this case, the motor speed may be increased via transmission slip, and the motor may autonomously and actively generate acceleration torque to accelerate, thereby reducing shifting shock.

However, when the motor generates acceleration torque, this means that energy is used in a driving direction but not a regenerative direction, and thus there is a need for a procedure of previously comparing and analysing regenerative efficiency or an energy amount before a gear shift event occurs.

That is, a method for regenerating a larger amount of energy may be selected from a method of maintaining a current gear stage and performing regenerative driving with low efficiency and a method of performing gear shift to a low stage and performing active shift control (ASC) during gear shift and then performing regenerative driving with relatively high efficiency even if energy is consumed.

In detail, a regenerative energy amount may be predicted in consideration of ASC performing, and then a predicted regenerative energy amount during gear shift may be compared with a predicted regenerative energy amount when a gear stage is maintained, and whether ASC is actually performed may be determined.

In the present disclosure, a detailed method or procedure for performing ASC may apply a known ASC control method and procedure.

FIG. 3 is a diagram illustrating an example in which a motor regenerative driving point for each mode is adjusted according to the present disclosure.

Figure 4:
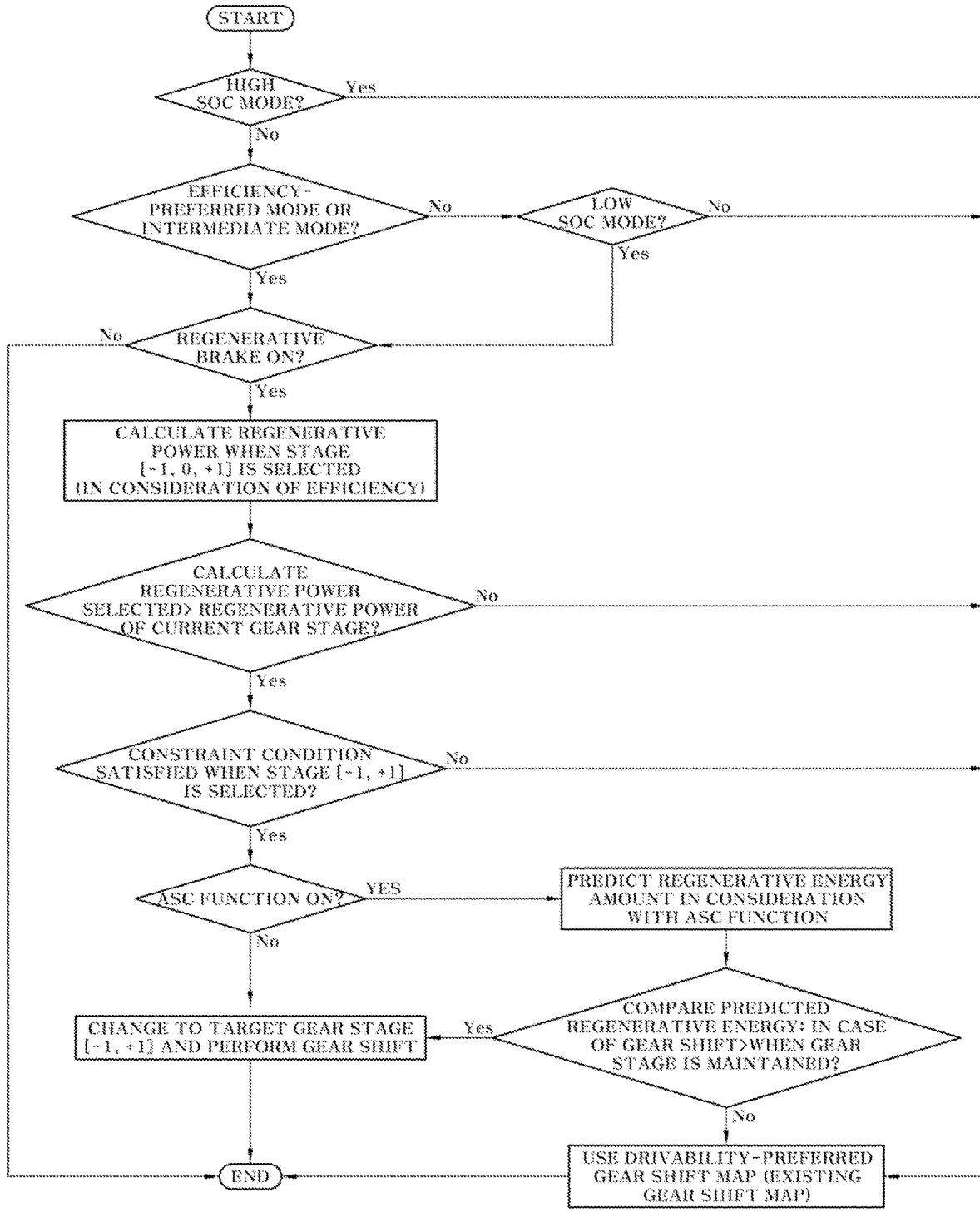
FIG. 4 is a flowchart illustrating a regenerative brake method according to various embodiments of the present disclosure.
Figure 5:
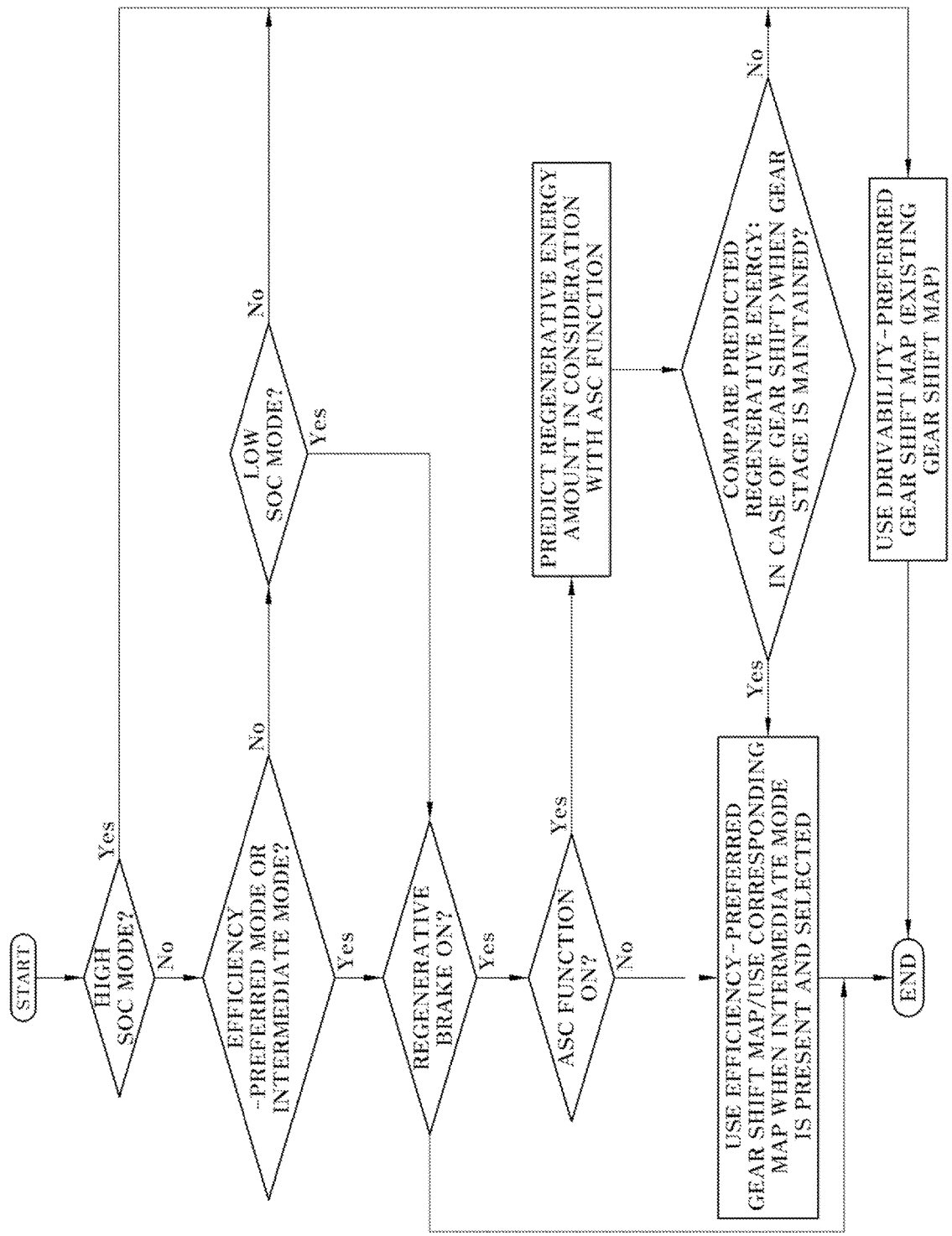
FIG. 5 is another flowchart illustrating a regenerative brake method according to various embodiments of the present disclosure.
Figure 6:
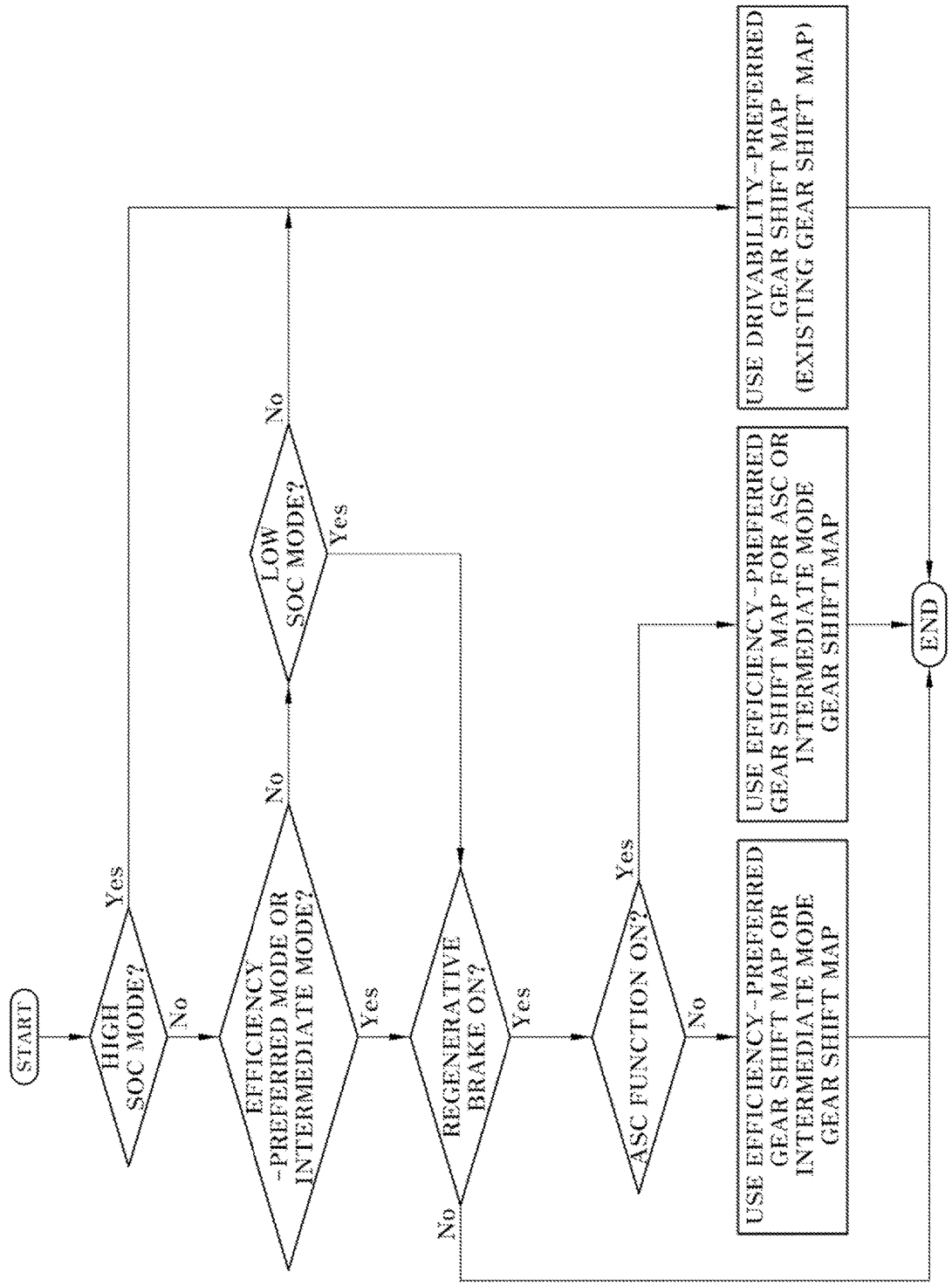
FIG. 6 is another flowchart illustrating a regenerative brake method according to various embodiments of the present disclosure.

FIGS. 4 to 6 are flowcharts illustrating a regenerative brake method according to various embodiments of the present disclosure.

FIG. 4 illustrates an embodiment in which only one gear shift map, i.e., drivability-preferred gear shift map, and in this case, the drivability-preferred gear shift map may be used when the driver selects the drivability-preferred mode.

The drivability-preferred gear shift map may be an existing gear shift map that is used in a conventional regenerative brake procedure.

First, at step S101, a controller may determine whether a current battery SOC is a high SOC state with a predetermined setting level or greater, for example, a high SOC mode in which the current battery SOC reaches an upper threshold value to enter a charging-limit state. At step S102, when the current battery SOC is the high SOC mode, it is not required to increase efficiency, and thus regenerative brake in the drivability-preferred mode in which gear shift is performed using the drivability-preferred gear shift map may be performed during regenerative brake.

In contrast, when the current battery SOC is not the high SOC mode, at step S103 the controller may determine whether a mode selected by the driver is an efficiency-preferred mode or an intermediate mode. At step S104, when the efficiency-preferred mode or the intermediate mode is selected, the controller may determine whether regenerative brake satisfying a predetermined regenerative brake condition is turned on.

At step S105, even if the efficiency-preferred mode or the intermediate mode is not currently selected, when the current battery SOC is a low SOC state with a predetermined setting level or greater, for example, a low SOC mode in which the current battery SOC reaches a low threshold value to enter a discharge-limit state, it may be desirable to perform regenerative brake in the efficiency-preferred mode, and thus whether regenerative brake is turned on may also be performed in a subsequent operation.

In the above operation, when the current battery SOC is not currently the low SOC mode, at Step S102, regenerative brake in the drivability-preferred mode may be performed using a drivability-preferred gear shift map during regenerative brake.

At step S106, when regenerative brake is turned on, regenerative power (charged power) may be each calculated in the case of a low gear stage of −1 compared with a current gear stage, in the case of a high gear stage of +1 compared with the current gear stage, and in the case in which the current gear stage is maintained, between the lowest and highest gear stages.

Here, the case of the high gear stage of +1 (increase by one stage) compared with the current gear stage refers to the case in which one stage is increased from the current gear stage, and the case of the low gear stage of −1 (decrease by one stage) compared with the current gear stage refers to the case in which one stage is decreased from the current gear stage.

As such, regenerative power may each be calculated in the case in which the current gear stage is selected, in the case in which a high gear stage (increase by one stage) compared with the current gear stage is selected, and in the case in which a low gear stage (decrease by one stage) compared with the current gear stage is selected, in which case the regenerative power may be calculated in consideration of efficiency.

However, calculation may not be performed on a region that exceeds a range of shiftable gear stages.

When continuously variable transmission but not multi-stage transmission is applied, a minute phase may also be set to select a low gear stage or a high gear stage, and thus, it may also be possible to apply the regenerative brake method to a vehicle including the continuously variable transmission installed therein.

In order to calculate regenerative power in consideration of efficiency, mechanical transmission efficiency η1 of a transmission (or a whole driving system) based on a candidate gear stage number, regenerative torque when a corresponding gear stage is selected, a transmission speed, oil temperature of a transmission speed, or the like may be determined through a map.

Simultaneously, motor regenerative efficiency η2 based on regenerative torque and motor speed when a candidate stage is selected may be determined through a map, and inverter-battery efficiency η3 based on voltage, current, battery temperature, or the like when the motor is regenerated may be determined through a map.

Thus, regenerative power may be calculated using the following Equation 1:

$$\text{Regenerative Power} = \eta 1 \times \eta 2 \times \eta 3 \times \text{motor speed} \times \text{motor torque} \quad (1)$$

As described above, regenerative power of increased and decreased candidate gear stages including the current gear stage may be calculated, and then, at step S107, the controller may compare regenerative power when a high gear stage (+1 stage) is selected and a low gear stage (−1 stage) is selected, with regenerative power when the current gear stage is maintained. When the regenerative power corresponding to selection of the low gear stage (−1 stage) is greater than the regenerative power corresponding to maintenance of the current gear stage, the controller may determine whether a constraint condition that is determined when the low or high gear shift is selected is satisfied at step S108.

When the regenerative power corresponding to selection of the high gear stage (increase by 1 stage) or the low gear stage (decrease by 1 stage) is equal to or less than regenerative power corresponding to maintenance of the current gear stage, the controller may perform gear shift and regenerative brake using the drivability-preferred gear shift map at step S102.

As described above, a constraint condition is determined when a low or high gear shift is performed to increase regenerative efficiency, and in this regard, the corresponding gear shift may actually begin only when the constraint condition is satisfied.

When the constraint condition is not satisfied, a drivability-preferred gear shift map that is an existing gear shift map may be used during regenerative brake at step S102.

According to the present disclosure, the constraint condition may include a hardware constraint, a constraint setting value of an intermediate mode, a time condition, or the like, and as determination of the hardware constraint condition, gear shift may be performed to a candidate gear stage of a high or low gear stage, and then whether motor speed and motor torque are present in an allowable range may be determined.

In order to overcome vehicle NVH and to ensure drivability, when an intermediate mode is selected, a stricter condition than the hardware constraint may be applied.

However, when a constraint condition of the intermediate mode is stricter than characteristics in the current gear stage selected by an existing drivability-preferred gear shift map prior to a regenerative driving point efficiency strategy is used, this may be negligible, and only when a constraint setting value of the intermediate mode suggests a condition of a high speed and a high load than a condition when the current gear stage is selected, this may be valid.

In order to an effect of substantially increasing regenerative efficiency from being offset by frequency gear shift, it is not allowed to return to the gear stage number within a setting time after gear shift is performed.

To this end, the constraint condition may a condition in which an elapsed time after immediately previous gear shift is within a setting time when the same gear stage number as the immediately previous gear shift is returned.

Then, as described above in step S108, when the constraint condition is satisfied when high or low-gear stage is selected, at step S109 a determination is made whether an active shift control (ASC) function is in on-state by a driver. At step S110, when the ASC function is in an off-state but not an on-state, a target gear stage change (increase or decrease compared with the current gear stage) and gear shift may be performed using general gear shift, but not ASC.

Here, ASC may refer to active torque feedback control for more rapid gear shift in an inertia phase (a phase in which a speed of an input end of a transmission is actually changed due to gear shift) during a gear shift procedure of multi-stage transmission.

When ASC is performed, e.g., when a gear stage number is reduced to stage 2 from stage 3, if a motor speed is assumed to be changed to 3000 rpm from 2000 rpm, driving torque may be instantly applied to the motor to make the motor speed be more rapidly increased from 2000 rpm to 3000 rpm.

As a result, it may be possible to reduce a time for gear shift and to ensure more enhanced drivability through such ASC.

However, the ASC function requires driving torque of a motor during downward gear shift, and thus battery power may be consumed, and low-gear shift may be performed in order to recover a larger amount of energy through efficiency at a regenerative driving point, but when battery power is consumed due to the ASC function, the regenerative driving point efficiency may be meaningless.

Accordingly, when ASC needs to be performed, a method for achieving a high battery charge amount needs to be determined via comparison between the case in which regenerative efficiency is increased prior to ASC after ASC to a low stage number and the case in which regenerative brake is performed with relatively low regenerative efficiency while the current gear stage is maintained without gear shift.

Thus, the regenerative energy amount in the case of ASC and the regenerative energy amount when the current gear stage is maintained may be predicted at step S111, and the regenerative energy amount in the case of ASC and the regenerative amount when the current gear stage is maintained may be compared with each other at step S112. When the regenerative energy amount in the case of ASC is larger than the regenerative energy amount when the current gear stage is maintained, ASC to a target gear stage may be performed at step S110.

In contrast, when the regenerative energy amount in the case of ASC is equal to or less than the regenerative energy amount when the current gear stage is maintained regenerative brake may be performed using a drivability-preferred gear shift map that is a reference gear shift map at step S102.

In the above case, a predicted value of regenerative energy may be calculated under the assumption of status quo in which a current brake pedal input of a driver and a road state are maintained.

When it is possible to use front road surface gradient information, front vehicle information, or the like, regenerative energy may be predicted in consideration of the information.

FIG. 5 is a diagram illustrating an embodiment in which an efficiency-preferred gear shift map or an intermediate mode gear shift map is used in addition to a drivability-preferred gear shift map. FIG. 6 is a diagram illustrating an embodiment in which an efficiency-preferred gear shift map with an on-state ASC function is additionally used.

Referring to FIG. 5, like in the embodiment of FIG. 4, when the ASC function is in an on-state, at step S111 a regenerative energy amount in the case of ASC and a regenerative energy amount when the current gear stage is maintained may be predicted and compared with each other (step S112). At step S113, when the regenerative energy amount in the case of ASC is larger than the regenerative energy amount when the current gear stage is maintained, ASC may be performed during regenerative brake using the efficiency-preferred gear shift map or the intermediate mode gear shift map.

In contrast, at step S102, when the regenerative energy amount in the case of ASC is not larger than the regenerative energy amount when the current gear stage is maintained, regenerative brake and gear shift may be performed using a drivability-preferred gear shift map that is an existing gear shift map.

Referring to FIG. 6, at step S114, when the ASC function is in an on-state, the efficiency-preferred gear shift map or intermediate mode gear shift map for ASC may be used during regenerative brake. At Step S115, when the ASC function is in an off-state, a separate efficiency-preferred gear shift map or intermediate mode gear shift map may be used during regenerative brake.

As such, according to the present disclosure, diversified regenerative brake methods may be provided to allow the driver to select a desired regenerative brake method, and a driving point selection strategy may be performed during regeneration.

Thus, the regenerative brake method of the vehicle according to the present disclosure may increase regenerative efficiency while overcoming a conventional problem in terms of a sense of driving unfamiliarity due to adjustment of a driving point during generation in an electric motored vehicle driven by a motor.

When the regenerative brake method of the vehicle according to the present disclosure is used, diversified regenerative brake methods may be provided to allow the driver to select a desired regenerative brake method, thereby enhancing driver's satisfaction and vehicle marketability.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

The invention claimed is:

1. A regenerative brake method of a vehicle, the method comprising:
    selecting and inputting one of a plurality of regenerative brake modes by a driver and recognizing the regenerative brake mode selected by the driver, by a controller;
    determining an on/off-state of an active shift control (ASC) function by the controller when the regenerative brake mode selected by the driver is an efficiency-preferred mode or an intermediate mode;
    controlling a motor speed during regenerative brake and simultaneously performing ASC control for changing a gear stage, by the controller when the ASC function is in the on-state; and
    controlling gear shift for changing the gear stage without control of the motor speed during regenerative brake, by the controller when the ASC function is in the off-state.

2. The method of claim 1, wherein, when a battery state of charge (SOC) state is a high SOC state with a predetermined setting level or greater, the controller controls regenerative brake of a drivability-preferred mode for gear shift using a drivability-preferred gear shift map during regenerative brake.

3. The method of claim 1, wherein, when a battery state of charge (SOC) state is not a high SOC state with a predetermined setting level or greater, the selecting and inputting, the determining, the controlling the motor speed, and the controlling the gear shift are performed.

4. The method of claim 1, wherein, when the regenerative brake mode selected by the driver is not an efficiency-preferred mode and an intermediate mode, if a battery state of charge (SOC) state is a low SOC state with a predetermined setting level or less, the controller determines the on/off-state of the ASC function and then performs the controlling the motor or the controlling the gear shift.

5. The method of claim 1, wherein the determining the on/off-state includes:
    when the regenerative brake mode selected by a user is the efficiency-preferred mode or the intermediate mode, if a current state is a regenerative brake on-state satisfying a regenerative brake condition, calculating each of regenerative power when a gear stage is changed and regenerative power when a current gear stage is maintained, by the controller; and when the regenerative power when the gear stage is changed is larger than the regenerative power when the current gear stage is maintained, determining the on/off-state of the ASC function, by the controller.

6. The method of claim 5, wherein the determining includes:

when the regenerative power when the gear stage is changed is larger than the regenerative power when the current gear stage is maintained, determining whether a predetermined constraint condition is satisfied, by the controller; and when the predetermined constraint condition is satisfied, determining the on/off-state of the ASC function, by the controller.

7. The method of claim 6, wherein, when the regenerative power when the gear stage is changed is equal to or less than the regenerative power when the current gear stage is maintained, or the constraint condition determined when the gear stage is changed not satisfied, the controller controls regenerative brake of a drivability-preferred mode in which gear shift is performed using a drivability-preferred gear shift map during regenerative brake.

8. The method of claim 6, wherein the constraint condition includes a condition in which a motor speed and motor torque are present in an allowable range after gear shift.

9. The method of claim 6, wherein the constraint condition includes a condition in which an elapsed time after immediately previous gear shift is within a setting time when the same gear stage number as the immediately previous gear shift is returned.

10. The method of claim 1, wherein the controlling the motor speed includes:

when the ASC function is in the on-state, predicting a regenerative energy amount in a case of ASC and a regenerative energy amount when a current gear stage is maintained, by the controller; and comparing the regenerative energy amount in the case of ASC with the regenerative energy amount when the current gear stage is maintained, and when the regenerative energy amount in the case of ASC is larger than the regenerative energy amount when the current gear stage is maintained, controlling the motor speed during regenerative brake and simultaneously performing ASC control for changing a gear stage.

11. The method of claim 10, wherein, when the regenerative energy amount in the case of ASC is equal to or less than the regenerative energy amount when the current gear stage is maintained, the controller controls regenerative brake of a drivability-preferred mode for gear shift using a drivability-preferred gear shift map during regenerative brake.

12. The method of claim 1, wherein the controlling the gear shift includes controlling regenerative brake of an efficiency-preferred mode or intermediate mode for gear shift using an efficiency-preferred gear shift map or an intermediate mode gear shift map during regenerative brake, by the controller when the ASC function is in the off-state.

13. The method of claim 1, wherein the controlling the motor speed includes:

when the ASC function is in the on-state, predicting a regenerative energy amount in a case of ASC and a regenerative energy amount when a current gear stage is maintained, by the controller; and comparing the regenerative energy amount in the case of ASC with the regenerative energy amount when the current gear stage is maintained, and when the regenerative energy amount in the case of ASC is larger than the regenerative energy amount when the current gear stage is maintained, performing ASC control using an efficiency-preferred gear shift map or an intermediate mode gear shift map during regenerative brake.

14. The method of claim 1, wherein the controlling the motor speed includes:

when the ASC function is in the on-state, performing ASC control using an efficiency-preferred gear shift map for ASC or an intermediate mode gear shift map for ASC during regenerative brake, by the controller.

\* \* \* \* \*